United States Patent
Ozawa et al.

(10) Patent No.: US 8,617,414 B2
(45) Date of Patent: Dec. 31, 2013

(54) POWDERS USED FOR PRODUCING NI-CU-ZN SYSTEM FERRITE CERAMICS SINTERED BODY AND METHOD FOR MANUFACTURING THE SAME

(75) Inventors: Shuichi Ozawa, Nagoya (JP); Naoto Ohira, Nagoya (JP); Kouichi Kondou, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 329 days.

(21) Appl. No.: 13/037,746

(22) Filed: Mar. 1, 2011

(65) Prior Publication Data

US 2011/0230329 A1    Sep. 22, 2011

(30) Foreign Application Priority Data

Mar. 18, 2010 (JP) .................... 2010-062764
Jan. 28, 2011 (JP) .................... 2011-016081

(51) Int. Cl.
C04B 35/26    (2006.01)

(52) U.S. Cl.
USPC .................................... 252/62.56

(58) Field of Classification Search
USPC .............. 252/62.62, 62.56, 62.51 R
See application file for complete search history.

(56) References Cited

U.S. PATENT DOCUMENTS

| | | | |
|---|---|---|---|
| 6,104,272 A | 8/2000 | Yamamoto et al. | |
| 6,187,218 B1 | 2/2001 | Kodama et al. | |
| 2001/0028051 A1* | 10/2001 | Ono et al. | 252/62.62 |
| 2005/0188529 A1* | 9/2005 | Uriu et al. | 29/602.1 |
| 2005/0230656 A1* | 10/2005 | Umemoto et al. | 252/62.63 |
| 2010/0033286 A1* | 2/2010 | Katayama et al. | 336/200 |

FOREIGN PATENT DOCUMENTS

| | | |
|---|---|---|
| EP | 1 219 577 A2 | 7/2002 |
| EP | 2 194 029 A1 | 6/2010 |
| JP | 11-121234 A1 | 4/1999 |
| JP | 11-345731 A1 | 12/1999 |
| JP | 2004-323283 A1 | 11/2004 |
| JP | 2005-029403 A1 | 2/2005 |
| JP | 2005029403 A * | 2/2005 |

* cited by examiner

Primary Examiner — Emily Le
Assistant Examiner — Lynne Edmondson
(74) Attorney, Agent, or Firm — Burr & Brown, PLLC

(57) ABSTRACT

The first invention relates to powders for producing a Ni—Cu—Zn system ferrite ceramics sintered body, comprising ferrite calcined powders and NiO powders, wherein the specific surface area of said ferrite calcined powders is within the range of 4.0 m²/g to 14.0 m²/g, the spinel included in said ferrite calcined powders is such that Ni does not solve, the composition of said spinel is such that $Fe_2O_3$ is within the range of 49.0 mol % to 60.0 mol % and the remaining comprises CuO and ZnO, and the ratio of ZnO relative to CuO in mole percent is within the range of 1.0 to 4.0.

6 Claims, 2 Drawing Sheets

US 8,617,414 B2

POWDERS USED FOR PRODUCING NI-CU-ZN SYSTEM FERRITE CERAMICS SINTERED BODY AND METHOD FOR MANUFACTURING THE SAME

TECHNICAL FIELD

The present invention relates to powders used for producing Ni—Cu—Zn system ferrite ceramics sintered body and a method for manufacturing the same.

DESCRIPTION OF RELATED ART

The gel casting method is known as a method for producing the ceramics compact in which the ceramics powders used for producing the electronic ports such as the ceramics inductor and the ceramics noise filter are the main component. The gel casting method is a method for producing the ceramics compact by casting the slurry having the ceramics powders as the main component into the cavity of the mold and solidifying and bridging the slurry in the mold. According to the gel casting method, at the process of solidifying and bridging the slurry, almost no cure shrinkage and dry shrinkage occurs and therefore the ceramics compact having the accurate shape can be obtained. In Unexamined Japanese Patent Publication Nos. 11-121234 and 11-345731, the method for manufacturing a coil-buried type inductor using the gel casting method is described.

In order to produce the ceramics compact having the accurate shape by the gel casting method, it is desired that the slurry used for producing the ceramics compact can uniformly extend all around in the cavity of the mold. In other words, it is desired that the ceramics powders dispersed in the slurry can uniformly extend all around in the cavity of the mold. For this end, it is preferred that the viscosity of the slurry is low.

On the other hand, in order to obtain the ceramics sintered body having the high density by firing the ceramics compact produced by the gel casting method, it is desired that the concentration of the ceramics powders in the ceramics compact is high and therefore it is desired that the concentration of the ceramics powders in the slurry used for obtaining the ceramics compact is high. However, generally, when the concentration of the ceramics powders in the slurry, the viscosity of the slurry is high. As explained above, this is undesirable in terms of obtaining the ceramics compact having the accurate shape.

Accordingly, for the slurry used for obtaining the ceramics sintered body having the high density and the accurate shape, the high concentration of the ceramics powders in the slurry and the low viscosity of the slurry which are the trade-off are required.

The object of the invention is to provide powders for producing the slurry having the high concentration of the ferrite powders and the low viscosity and a method for manufacturing the powders.

SUMMARY OF THE INVENTION

In order to solve the above-mentioned object, the first invention of this application relates to powders for producing a Ni—Cu—Zn system ferrite ceramics sintered body, comprising ferrite calcined powders and NiO powders,
wherein the specific surface area of said ferrite calcined powders is within the range of 4.0 m$^2$/g to 14.0 m$^2$/g, the spinel included in said ferrite calcined powders is such that Ni does not solve, the composition of said spinel is such that $Fe_2O_3$ is within the range of 49.0 mol % to 60.0 mol % and the remaining comprises CuO and ZnO, and the ratio of ZnO relative to CuO in mole percent is within the range of 1.0 to 4.0.

According to the first invention, the following effect can be obtained. That is, the ferrite calcined powders is known, which powders are obtained by firing the powders by mixing the $Fe_2O_3$ powders, the NiO powders, the CuO powders and ZnO powders with each other as the powders for producing the slurry used for producing the Ni—Cu—Zn system ferrite ceramics sintered body. When the remanent magnetization of this prior ferrite calcined powders are measured by the vibrating sample magnetometer (VSM), the remanent magnetization of this prior ferrite calcined powders are relatively high. Therefore, when the slurry is produced using the thus obtained ferrite calcined powders, the viscosity of the slurry is high due to the relatively high remanent magnetization of the ferrite calcined powders.

In this regard, from the study of the inventors of this application, it was realized that when the $Fe_2O_3$ powders, the NiO powders, the CuO powders and ZnO powders are mixed with each other and then are calcined, the remanent magnetization of the obtained ferrite calcined powders becomes high as the amount of Ni solving in the ferrite becomes high. Further, it was realized that the viscosity of the slurry is low in the case where the $Fe_2O_3$ powders, the CuO powders and ZnO powders except for the NiO powders are mixed with each other and then are calcined to obtain the ferrite calcined body, the NiO powders are mixed when the obtained ferrite calcined body is milled to obtain the ferrite calcined powders and the slurry is produced using the obtained powders as the main component.

Accordingly, the powders of the present invention comprises the ferrite calcined powders in which Ni does not solve and the NiO powders and therefore the viscosity of the slurry is maintained low even when the slurry having the high powder concentration is produced.

Further, the second invention of this application relates to slurry produced from the powders of the first invention of this application.

The slurry of the second invention is produced using the powders of the first invention of this application and therefore the slurry has the high powder concentration and the low viscosity.

Further, the third invention of this application relates to a Ni—Cu—Zn system ferrite ceramics sintered body produced from the slurry of the second invention of this application.

The Ni—Cu—Zn system ferrite ceramics sintered body of the third invention is produced using the slurry of the second invention of this application having the high powder concentration and the low viscosity and therefore the sintered body has the high density and the desired accurate shape.

Further, the fourth invention of this application relates to a method for manufacturing powders used for producing a Ni—Cu—Zn system ferrite ceramics sintered body, comprising:
a step of mixing $Fe_2O_3$ powders, CuO powders and ZnO powders except for NiO powders to obtain mixed powders;
a step of calcining said mixed powders obtained by said mixing step to obtain a ferrite calcined body; and
a step of milling said ferrite calcined body obtained by said calcination step to obtain ferrite calcined powders and at the same time, mixing said ferrite calcined powders with NiO powders;
wherein the specific surface area of said ferrite calcined powders obtained by said milling and mixing step is within the range of 4.0 m$^2$/g to 14.0 m$^2$/g, the spinel included in said ferrite calcined powders is such that Ni does not solve, the composition of said spinel is such that $Fe_2O_3$ is within the range of 49.0 mol % to 60.0 mol % and the remaining comprises CuO and ZnO and the ratio of ZnO relative to CuO in mole percent is within the range of 1.0 to 4.0.

According to the method of the fourth invention, as explained in relation to the first invention of this application, the powders can be obtained for producing the slurry having the high powder concentration and the low viscosity.

Further, the fifth invention of this application relates to a method for producing slurry, comprising a step of blending slurry using the powders manufactured by the method for manufacturing the powders of the fourth invention of this application.

According to the method of the fifth invention, the slurry having the high powder concentration and the low viscosity can be produced.

Further, the sixth invention of this application relates to a method for producing a ceramics sintered body, comprising a step of producing a compact using the slurry produced by the method for producing the slurry of the fifth invention and firing said compact to obtain a ceramics sintered body.

According to the method of the sixth invention, the ceramics sintered body having the high density and the desired accurate shape can be produced.

DETAILED DESCRIPTION OF THE INVENTION

Below, an embodiment of the powders of the present invention will be explained. The powders of this embodiment are used for producing an Ni—Cu—Zn system ferrite ceramics sintered body. Further, the powders of this embodiment comprise ferrite calcined powders and NiO powders. Furthermore, the specific surface area of the ferrite calcined powders is within the range of 4.0 $m^2$/g to 14.0 $m^2$/g. Further, the spinel included in the ferrite calcined powders is such that Ni does not solve. Furthermore, the composition of the spinel is such that $Fe_2O_3$ is within the range of 49.0 mol % to 60.0 mol % and the remaining comprises CuO and ZnO. Further, the ratio of ZnO relative to CuO in mole percent is within the range of 1.0 to 4.0.

Figure 1:
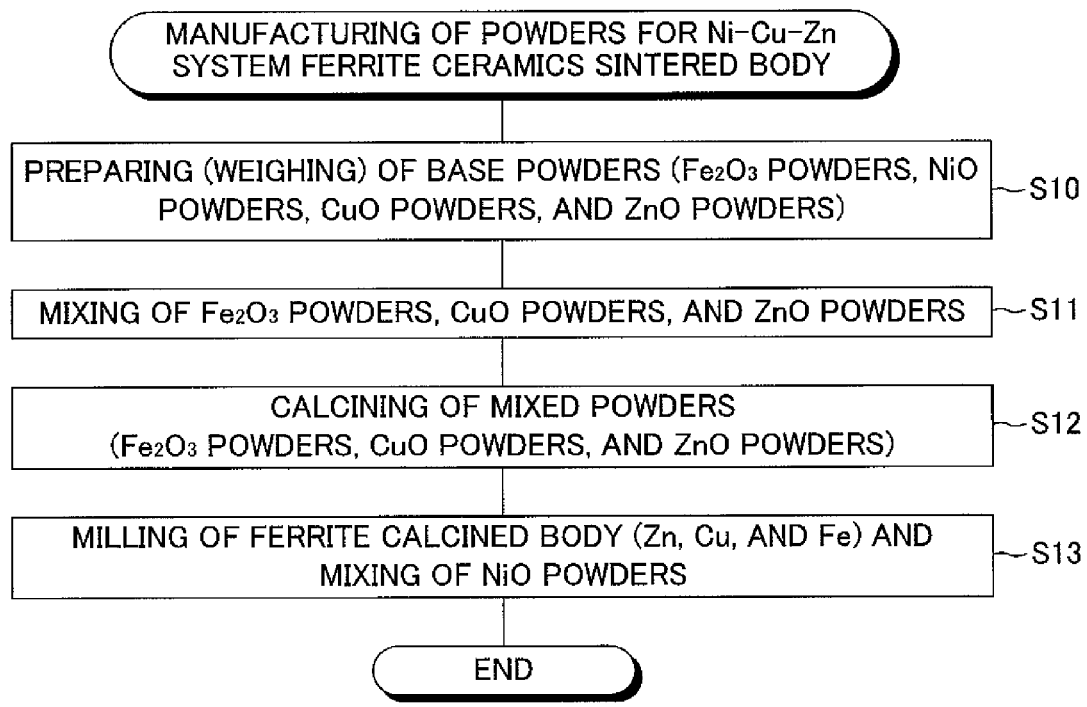
FIG. 1 is a view showing a flow of manufacturing powders of the invention.

Further, the powders of this embodiment are manufactured according to a flow shown in FIG. 1. First, as shown in the step 10 of FIG. 1, the base powders (i.e. $Fe_2O_3$ powders, NiO powders, CuO powders and ZnO powders) are prepared, which base powders can constitute a Ni—Cu—Zn system ferrite ceramics fired body which is intended to be finally obtained. In this regard, the $Fe_2O_3$ powders, NiO powders, CuO powders and ZnO powders are weighed, depending on the desired mole percent of Fe, Ni, Cu and Zn of the ceramics sintered body which is intended to be finally obtained.

As the composition of the Ni—Cu—Zn system ferrite ceramics sintered body which is intended to be finally obtained, assuming that the sum of $Fe_2O_3$, NiO, CuO and ZnO is 100 mol %, it is preferred that $Fe_2O_3$ is within the range of 47 mol % to 49 mol %, NiO is within the range of 8 mol % to 33 mol %, CuO is within the range of 7 mol % to 12 mol % and ZnO is within the range of 9 mol % to 36 mol %. Beyond this range in mole percent, the degree of the densification of the sintered body may decrease or the desired property of the inductor may not be satisfied. In the Ni—Cu—Zn system ferrite ceramics sintered body, as necessary, oxide of Mn, Co, Cr, Bi, etc. can be included. These oxides may be added at the same time as the mixing of the base powders such as $Fe_2O_3$ powders or may be added at the same time as the mixing of the NiO powders. Further, in the Ni—Cu—Zn system ferrite ceramics sintered body, any impure substances such as Zr, Si, P, S, etc. which are inevitably mixed.

Next, as shown in the step 11 of FIG. 1, the weighted base powders except for NiO (i.e. the weighed base powders of $Fe_2O_3$ powders, CuO powders and ZnO powders) are mixed. It should be noted that this mixing of the base powders are performed, for example, by the wet mixing by the ball-mill method using pure water (e.g. ion-exchanged water) as a dispersion medium.

Next, as shown in the step 12 of FIG. 1, the thus mixed base powders are calcined at a predetermined temperature (i.e. a calcination temperature) during a predetermined time and thereby a ferrite calcined body is obtained. In this regard, the predetermined temperature and the predetermined time are set to those such that Cu and Zn can be completely or generally completely solved, respectively. As is obvious, when the ferrite calcined body is produced, the NiO powders are not used and therefore Ni does not solve in the ferrite calcined body.

Next, as shown in the step 13 of FIG. 1, the thus obtained ferrite calcined body is milled and at the same time, the prepared NiO powders are mixed with the milled ferrite calcined body. Thereby, the powders of this embodiment comprising the ferrite calcined powders and the NiO powders can be obtained.

Figure 2:
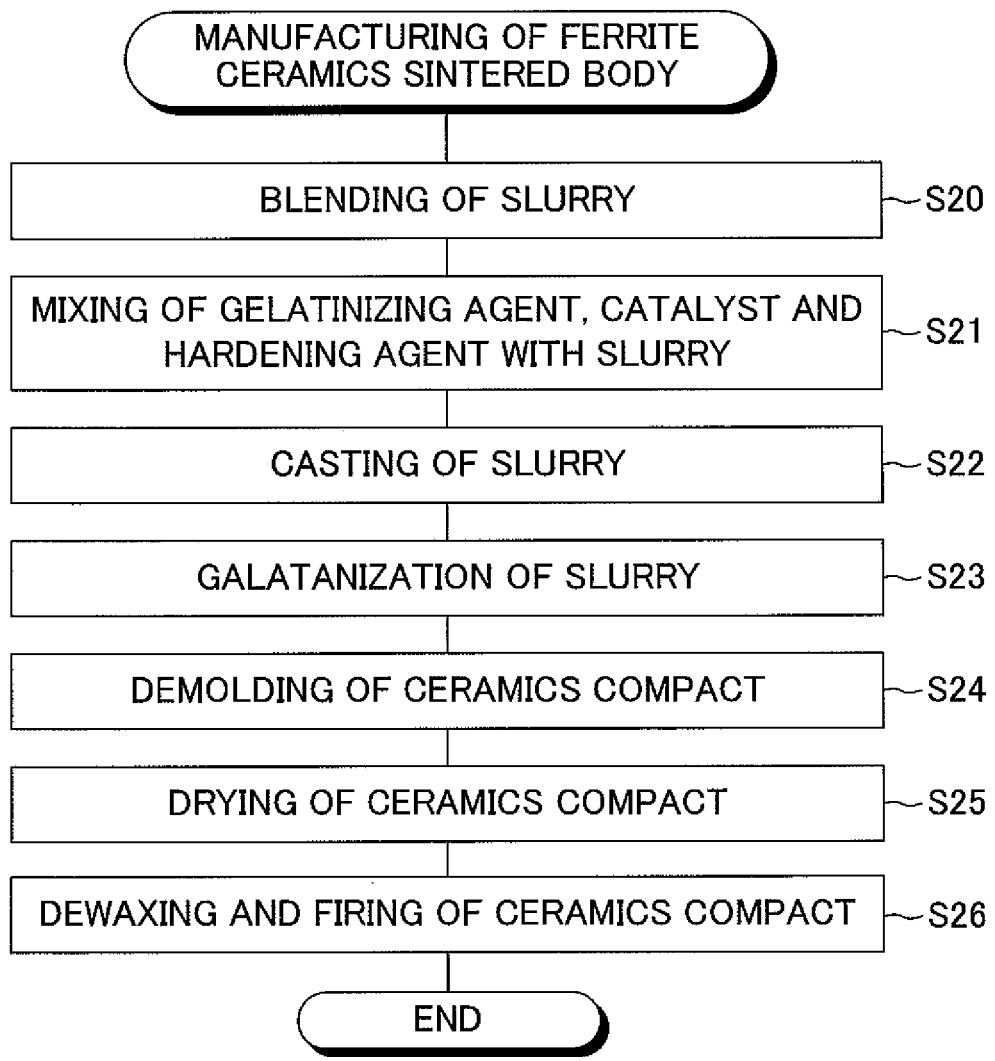
FIG. 2 is a view showing a flow of manufacturing a ceramics sintered body using the powders of the invention.

Further, a ceramic sintered body using the powders of this embodiment is produced according to a flow shown in FIG. 2. First, as shown in the step 20 of FIG. 2, dispersion medium and dispersion agent are mixed with the powders manufactured according to the flow shown in FIG. 1 and thereby slurry is blended. In this regard, the slurry is produced such that the concentration of the powder in the slurry is within the range of 40 vol % to 70 vol %.

Next, as shown in the step 21 of FIG. 2, gelatinizing agent, catalyst and hardening agent are mixed with the slurry produced as mentioned above.

Next, as shown in the step 22 of FIG. 2, the slurry which is mixed with the gelatinizing agent, the catalyst and the hardening agent as mentioned above is casted into a mold which has a cavity of a desired shape.

Next, as shown in the step 23 of FIG. 2, the dispersion medium, the gelatinizing agent and the hardening agent in the slurry react to each other by leaving the mold during a predetermined time and then the slurry gelatinizes and thereafter the slurry becomes solidified and thereby a ceramics compact is produced. In this regard, the predetermined time is, for example, within the range of 12 hours to 2 days.

The dispersion medium used herein is selected from the group of water, nonpolar organic solvent, polar organic solvent, etc. As the organic solvent selected for the dispersion medium, there are lower alcohol such as methanol, ethanol, isopropyl alcohol, etc., higher alcohol, acetone, hexane, benzene, toluene, diols such as ethylene glycol, etc., triols such as glycerin, etc., polybasic acid ester such as glutaric acid dimethyl, etc., esters having two or more ester groups such as triacetin, etc., polyester compound such as polycarboxylate, etc, phosphate ester, amine condensate, nonionic special amide compound, etc. The dispersion medium may be any of pure substance and mixture.

The gelatinizing agent is selected from the group of epoxy resin, acrylic resin, urethane resin, etc., and is selected from the group of substances which have a high compatibility with and low reactivity to the dispersion medium. For the epoxy resin, the polymer is selected, which polymer includes the constitutive monomer such as ethylene glycol diglycidyl ether, polyethylene glycol diglycidyl ether, propylene glycol diglycidyl ether, polypropylene glycol, glycerin diglycidyl ether, etc. For the acrylic resin, the polymer is selected, which polymer includes the constitutive monomer such as acrylamide, methacrylic acid, N-hydroxymethyl acrylamide, acrylic acid ammonium solt, etc. For the urethane resin, the polymer is selected, which polymer includes the constitutive monomer such as MDI (4,4'-diphenylmethane diisocyanate)-based isocyanate, HDI (hexamethylene diisocyanate)-based isocyanate, TDI (tolylene diisocyanate)-based isocyanate, IPDI (isophorone diisocyanate)-based isocyanate, isothiocyanate, etc.

The hardening agent is a substance which can be chemically coupled with the gelatinizing agent and promote the solidification of the slurry and is selected in consideration of the reactivity to the gelatinizing agent. Concretely, the hardening agent is selected from the group of polyalcohol such as ethylene glycol, polymers such as polyalkylene polyamine such as tetramethylethylenediamine, triethylenediamine, hexanediamine, ethylenediamine, etc., piperazines such as 1-(2-aminoethyl)piperazine, etc., polyetheramine such as polyoxyethylenediamine, etc., N,N'-methylenebisacrylamide, 6-dimethylamino-1-hexanol, ammonium persulfate, hydrogen peroxide, etc.

Catalyst such as 6-dimethylamino-1-hexanol, etc. is added in order to promote the reaction of the hardening (gelation).

Next, as shown in the step 24 of FIG. 2, the thus produced ceramics compact is removed (i.e. is demolded) from the mold. It should be noted that in order to facilitate the removing of the ceramics compact from the mold, a release agent is previously applied on the wall surface defining the cavity of the mold before the slurry is casted into the cavity of the mold.

Next, as shown in the step 25 of FIG. 2, the removed ceramics compact is dried by exposing it to the environment having a predetermined temperature during a predetermined time. In this regard, the predetermined time is, for example, several hours. Further, the predetermined temperature is, for example, within the range of 100 degrees centigrade to 150 degrees centigrade. It should be noted that any process such as a pressing process may be performed, as necessary, before the drying.

Next, as shown in the step 26 of FIG. 2, the thus dried ceramics compact is put in a firing furnace. Thereafter, the temperature in the firing furnace is maintained at a predetermined temperature during a predetermined time. In this regard, the predetermined temperature is, for example, within the range of 400 degrees centigrade to 600 degrees centigrade. Further, the predetermined time is, for example, several hours. Thereby, the ceramics compact is dewaxed. Thereafter, the temperature in the firing furnace is increased to a predetermined temperature at a predetermined temperature increasing rate and then the temperature in the firing furnace is maintained at the predetermined temperature during a predetermined time. Thereafter, the temperature in the firing furnace is decreased to the ambient temperature at a predetermined temperature decreasing rate. In this regard, the predetermined temperature increasing rate is, for example, within the range of 30 degrees centigrade per hour to 2000 degrees centigrade per hour. Further predetermined temperature is, for example, within the range of 700 degrees centigrade to 1100 degrees centigrade. Furthermore, the predetermined temperature decreasing rate is, for example, within the range of 30 degrees centigrade per hour to 200 degrees centigrade per hour. Thereby, the ceramic compact is fired and thereby a ceramic sintered body can be obtained.

It should be noted that in the flow shown in FIG. 2, as shown in the step 26, the dewaxing and the firing of the ceramics compact is performed in the sequential steps, however, the dewaxing of the ceramics compact and the firing of the ceramics compact can be performed in the separate steps.

It should be noted that the powders of this embodiment is used, for example, for producing laminated type inductors or a coil-buried type inductors. In the production of the coil-buried type inductor, independently of the manufacturing of the powders of this embodiment, a coil is made from an Ag wire and then the coil is positioned in the cavity of the mold. On the other hand, slurry is produced using the powders of this embodiment and then as explained above, gelatinizing agent, catalyst and hardening agent are mixed with the produced slurry. Thereafter, the slurry which the gelatinizing agent, the catalyst and the hardening agent are mixed is casted into the cavity of the mold which the coil is positioned. Thereafter, the mold is left in the atmospheric environment during a predetermined time and thereby a ceramics compact including the coil is produced. Thereafter, the produced ceramics compact is removed from the mold and then the removed ceramics compact is dried. Thereafter, the dried ceramics compact is fired. Thereby, a coil-buried type inductor is produced.

Further, slurry having a high concentration of the powders and the low viscosity can be produced using the powders of this embodiment and therefore the powders of this embodiment can be appropriately used for known molding such as the tape casting method, slip cast molding method comprising a step of blending slurry.

In the following table 1, in the case of producing a Ni—Cu—Zn system ferrite ceramics sintered body having a composition comprised of 47.6 mol % of $Fe_2O_3$, 16.3 mol % of NiO, 9.1 mol % of CuO and 27.0 mol % of ZnO, the experimental data regarding the powder of the present invention, the slurry produced using the powders and the ceramics sintered body produced using the slurry are described as comparative examples (CE) and examples of the present invention (EM), and the experimental data regarding the powder of prior art, the slurry produced using the powders and the ceramics sintered body produced using the slurry are described as prior art example (PE).

It should be noted that as explained above, the powder of the present invention are those obtained by mixing $Fe_2O_3$ powders, CuO powders and ZnO powders with each other, calcining the mixed powders to obtain a ferrite calcined body and thereafter milling the ferrite calcined body to form ferrite calcined powder and at the same time, mixing the ferrite calcined powder with NiO powders, and the powder of the prior art are ferrite calcined powder obtained by mixing $Fe_2O_3$ powders, NiO powders, CuO powders and ZnO powders with each other, calcining the mixed powders to obtain a ferrite calcined body and thereafter milling the ferrite calcined body.

Further, in the table 1, the median diameter (MD), i.e. the grain size in the comparative examples (CE) and the examples of the present invention (EM) is the particle size such that the integration value of the mass is 50% in the distribution of the particle size of the powders of the present invention, and the median diameter (MD), i.e. the grain size in the prior art examples (PE) is the particle size such that the integration value of the mass is 50% in the distribution of the particle size of the ferrite calcined powders. It should be noted that the median diameter (MD), i.e. the grain size is measured using water as the dispersion medium by the laser diffraction/scattering particle size distribution analyzer (HORIBA Company, LA-750)

Further, the specific surface area (SSA) in the comparative examples (CE) and the examples of the present invention (EM) is a surface area per unit mass (BET value) of the powders of the present invention and the specific surface are (SSA) in the prior art examples (PE) is a surface area per unit mass of the ferrite calcined powders. It should be noted that the specific surface area (SSA) was measured using the specific surface measuring instrument (SIMAZU Company, FlowSorb II 2300).

Further, the composition of the spinel (CS) is a composition of the spinel included in the ferrite calcined powders. It should be noted that the composition of the spinel (CS) was calculated as follows. That is, a pattern was obtained by the X-ray diffraction analysis of the mixed powders and the calcined powders (after the mixing of the NiO powders), integrated intensities of the (014) plane of the $Fe_2O_3$, the (200) plane of the NiO, the (111) plane of the CuO and the (101) plane of the ZnO were obtained regarding the mixed powders and the calcined powders, respectively, the ratio of the integrated intensity (=the integrated intensity of the calcined powders/the integrated intensity of the mixed powders) was obtained regarding each base material, the reactivity of each base material (=1−the integrated intensity of the calcined powders/the integrated intensity of the mixed powders) was calculated and the composition of the spinel (CS) was calculated by multiplying the mixed volume (mol %) by the reactivity such that the mole percent becomes totally 100 mol %. It should be noted that the X-ray diffraction analysis was performed by measuring the X-ray diffraction pattern by 2θ/θ method within a range of 20.0 degrees to 70.0 degrees. Further, a X-ray diffractometer of RIKAGAKU Company (Model Number: RINT2500) was used as the X-ray diffractometer, Cu—K α-ray was used as the source of the ray and a graphite monochromator was positioned in front of the detector. 50 kV-300 mA, scan width of 0.02 degrees, scan speed of 1 degree per minute, divergence slit of 1 degree, scattering slit of 1 degree and receiving slit of 0.3 mm were employed as the condition of the generation of X-ray.

Further, the remanent magnetization (RM) is the remanent magnetization of the ferrite calcined powders and also is the remanent magnetic flux density per unit mass when the maximum applied magnetic field which is 15 KOe (kilooersted) was applied under the sweep rate of the magnetic field of 5 minutes per loop and the time constant of 100 ms in the vibrating sample magnetometer (VSM). It should be noted that the remanent magnetic flux density was measured using the vibrating sample magnetometer (RIKEN DENSHI Company, BHV-525).

Further, in the table 1, ">20000" indicates that the viscosity of the slurry (VS) is beyond 20000 cps. It should be noted that the viscosity (VS) in the table 1 is the viscosity measured using the E type viscometer (BROOKFIELD Company, DV-II+) under the rotation rate of 0.3 rpm.

The slurry was produced by mixing the glutaric acid dimethyl of 27 parts by weight and the triacetin of 3 parts by weight as the dispersion medium and the carboxylic acid copolymer of 2 parts by weight as the dispersion agent with the powders of 100 parts by weight and the viscosity thereof was measured.

Using this slurry, the 4,4'-diphenylmethane diisocyanate of 6.4 parts by weight as the gelatinizing agent, the ethylene glycol of 0.35 parts by weight as the hardening agent and the 6-dimethylamino-1-hexanol of 0.06 parts by weight as the catalyst were added thereto and thereafter the slurry was casted into the mold and then hardened to produce a ceramics compact.

Further, the relative density (RD) is the relative density of the Ni—Cu—Zn system ferrite ceramics sintered body finally obtained by firing the ceramics compact produced using the slurry at 900 degrees centigrade. It should be noted that the relative density (RD) of this specification indicates the ratio of the density obtained by the Archimedean method relative to the theoretical density in percentage.

TABLE 1

|  | POWERS | | | FERRITE PRE-FIRED POWDERS | | | | | | PC | | | |
| --- | --- | --- | --- | --- | --- | --- | --- | --- | --- | --- | --- | --- | --- |
|  | | | | | | | | | | 40 Vol % | | 45 Vol % | |
|  | CT | MD | SSA | CS (mol %) | | | | | RM Br | VS | RD | VS | RD |
|  | (° C.) | (μm) | (m2/g) | Fe2O3 | NiO | CuO | ZnO | ZnO/CuO | (emu/g) | (cps) | (%) | (cps) | (%) |
| CE 1-1 | 600 | 0.8 | 4.0 | 48.2 | 0.0 | 7.9 | 43.9 | 5.6 | 0.03 | 70 | 83 | 350 | 86 |
| EM 1-1 | 700 | 0.8 | 4.0 | 49.5 | 0.0 | 12.7 | 37.8 | 3.0 | 0.12 | 110 | 93 | 500 | 95 |
| EM 1-2 | 800 | 0.8 | 4.0 | 49.7 | 0.0 | 12.7 | 37.7 | 3.0 | 0.32 | 140 | 95 | | |
| EM 1-3 | 900 | 0.8 | 4.0 | 51.2 | 0.0 | 12.3 | 36.5 | 3.0 | 0.41 | 90 | 96 | | |
| EM 1-4 | 1000 | 0.8 | 4.0 | 54.1 | 0.0 | 11.6 | 34.3 | 3.0 | 0.48 | 80 | 97 | | |
| PE 1-1 | 700 | 0.8 | 4.0 | 47.9 | 2.8 | 12.4 | 36.8 | 3.0 | 0.40 | 220 | 92 | 960 | 95 |
| PE 1-2 | 800 | 0.8 | 4.0 | 47.9 | 13.0 | 9.9 | 29.2 | 3.0 | 5.50 | 2800 | 97 | | |
| PE 1-3 | 900 | 0.8 | 4.0 | 47.6 | 16.3 | 9.1 | 27.0 | 3.0 | 11.20 | >20000 | 96 | | |
| CE 2-1 | 600 | 0.3 | 9.0 | 48.5 | 0.0 | 8.2 | 43.3 | 5.3 | 0.04 | 130 | 87 | 550 | 89 |
| EM 2-1 | 700 | 0.3 | 9.0 | 49.1 | 0.0 | 12.8 | 38.1 | 3.0 | 0.25 | 250 | 95 | | |
| EM 2-2 | 750 | 0.3 | 9.0 | 49.6 | 0.0 | 12.7 | 37.7 | 3.0 | 0.33 | 320 | 97 | | |
| EM 2-3 | 850 | 0.3 | 9.0 | 49.7 | 0.0 | 12.7 | 37.7 | 3.0 | 0.43 | 110 | 97 | | |
| EM 2-4 | 950 | 0.3 | 9.0 | 53.5 | 0.0 | 11.7 | 34.8 | 3.0 | 0.38 | 100 | 98 | | |
| EM 2-5 | 1050 | 0.3 | 9.0 | 55.6 | 0.0 | 11.2 | 33.2 | 3.0 | 0.45 | 70 | 97 | | |
| PE 2-1 | 700 | 0.3 | 9.0 | 47.9 | 2.8 | 12.4 | 36.8 | 3.0 | 0.90 | 420 | 94 | 1230 | 97 |
| PE 2-2 | 750 | 0.3 | 9.0 | 47.4 | 8.0 | 11.3 | 33.4 | 3.0 | 1.89 | 950 | 97 | | |
| PE 2-3 | 850 | 0.3 | 9.0 | 47.6 | 16.3 | 9.1 | 27.0 | 3.0 | 10.30 | >20000 | 98 | | |
| CE 3-1 | 600 | 0.1 | 14.0 | 47.9 | 0.0 | 8.5 | 43.6 | 5.3 | 0.05 | 150 | 90 | 630 | 92 |
| EM 3-1 | 1050 | 0.1 | 14.0 | 55.6 | 0.0 | 11.2 | 33.2 | 3.0 | 0.63 | 210 | 98 | | |
| PE 3-1 | 1050 | 0.1 | 14.0 | 47.6 | 16.3 | 9.1 | 27.0 | 3.0 | 12.15 | >20000 | 98 | | |

The followings can be understood from the experimental data of the table 1. That is, assuming that 500 cps which is the upper limit of the viscosity (in other words, 500 cps or less) such that the slurry can uniformly extend all around in the cavity when the slurry is casted into the cavity of the mold is referred to as "preferred viscosity" and 95 percent which is the preferred lower limit density (in other words, 95 percent or more) as the relative density of the finally obtained ceramics sintered body is referred to as "preferred relative density", in the case where the slurry having the powder concentration (PC) of 40 vol % was produced and the ceramics sintered body was produced using the slurry, the examples of the present invention (EM) 1-2 to 1-4, 2-1 to 2-5 and 3-1 were the examples in which the viscosity of the slurry (VS) was equal to or lower than the preferred viscosity and the relative density (RD) of the ceramics sintered body was equal to or higher than the preferred relative density and the remaining of the examples of the present invention (EM), the comparative examples (CE) and the prior art examples (PE) had the viscosity of the slurry (VS) higher than the preferred viscosity or the relative density (RD) of the ceramics sintered body lower than the preferred relative density. On the other hand, in the case where the slurry having the powder concentration (PC) of 45 vol % was produced using the powders having the viscosity of the slurry (VS) equal to or lower than the preferred viscosity and the relative density (RD) lower than the preferred relative density of the examples of the present invention (EM) 1-1, the comparative examples (CE) 1-1, 2-1 and 3-1 and the prior art examples (PE) 1-1 and 2-1 and the ceramic sintered body was produced using the slurry, the example of the present invention (EM) 1-1 was the example in which the viscosity of the slurry (VS) was equal to or lower than the preferred viscosity and the relative density (RD) of the ceramics sintered body was equal to or higher than the preferred relative density and the comparative examples (CE) and the prior art examples (PE) had the viscosity of the slurry (VS) higher than the preferred viscosity or the relative density (RD) of the ceramics sintered body lower than the preferred relative density.

Further, comparing the examples of the present invention (EM) with the prior art examples (PE), it can be understood that the viscosity of the slurry (VS) of the examples of the present invention is lower than that of the prior art examples and becomes largely lower than that of the prior art examples as the calcination temperature (CT) becomes high. Further, it can be understood that in the prior art examples, the viscosity of the slurry (VS) becomes high as the calcination temperature (CT) becomes high, while in the examples of the present invention (EM), the viscosity of the slurry becomes low as the calcination temperature becomes high.

Further, in the case where the powders of the present invention was manufactured changing the specific surface area (SSA) of the ferrite calcined powders between 3.0 $m^2/g$ and 16.0 $m^2/g$, the slurry was produced using the slurry and the ceramics sintered body was produced using the slurry, when the specific surface area of the ferrite calcined powder was smaller than 4.0 $m^2/g$, the relative density (RD) of the ceramics sintered body was lower than the preferred relative density and when the specific surface area of the ferrite calcined powder was greater than 14.0 $m^2/g$, the viscosity of the slurry (VS) was higher than the preferred viscosity.

Further, in the following table 2, in the case of producing a Ni—Cu—Zn system ferrite ceramics sintered body having a composition comprised of 48.1 mol % of $Fe_2O_3$, 12.6 mol % of NiO, 8.0 mol % of CuO and 31.3 mol % of ZnO, the experimental data similar to that of the table 1 is described.

TABLE 2

| | POWDERS | | | FERRITE PRE-FIRED POWDERS | | | | | | PC 40 Vol % | |
|---|---|---|---|---|---|---|---|---|---|---|---|
| | CT | MD | SSA | CS (mol %) | | | | | RM Br | VS | RD |
| | (° C.) | (μm) | (m2/g) | Fe2O3 | NiO | CuO | ZnO | ZnO/CuO | (emu/g) | (cps) | (%) |
| CE 4-1 | 600 | 0.3 | 9.0 | 48.0 | 0.0 | 8.8 | 43.2 | 4.9 | 0.03 | 120 | 88 |
| EM 4-1 | 700 | 0.3 | 9.0 | 49.2 | 0.0 | 10.4 | 40.4 | 3.9 | 0.12 | 210 | 96 |
| EM 4-2 | 800 | 0.3 | 9.0 | 50.2 | 0.0 | 10.2 | 39.6 | 3.9 | 0.25 | 230 | 97 |
| EM 4-3 | 900 | 0.3 | 9.0 | 52.3 | 0.0 | 9.7 | 38.0 | 3.9 | 0.38 | 180 | 97 |
| PE 4-1 | 700 | 0.3 | 9.0 | 48.3 | 3.2 | 9.9 | 38.6 | 3.9 | 0.87 | 520 | 96 |
| PE 4-2 | 900 | 0.3 | 9.0 | 48.1 | 12.6 | 8.0 | 31.3 | 3.9 | 8.70 | >20000 | 98 |

Further, in the following table 3, in the case of producing a Ni—Cu—Zn system ferrite ceramics sintered body having a composition comprised of 47.3 mol % of $Fe_2O_3$, 28.0 mol % of NiO, 10.2 mol % of CuO and 14.5 mol % of ZnO, the experimental data similar to that of the table 1 is described.

TABLE 3

| | POWDERS | | | FERRITE PRE-FIRED POWDERS | | | | | | PC 40 Vol % | |
|---|---|---|---|---|---|---|---|---|---|---|---|
| | CT | MD | SSA | CS (mol %) | | | | | RM Br | VS | RD |
| | (° C.) | (μm) | (m2/g) | Fe2O3 | NiO | CuO | ZnO | ZnO/CuO | (emu/g) | (cps) | (%) |
| CE 5-1 | 600 | 0.3 | 9.0 | 47.9 | 0.0 | 7.6 | 44.5 | 5.9 | 0.08 | 280 | 85 |
| EM 5-1 | 700 | 0.3 | 9.0 | 49.0 | 0.0 | 21.1 | 29.9 | 1.4 | 0.45 | 380 | 95 |
| EM 5-2 | 800 | 0.3 | 9.0 | 50.0 | 0.0 | 20.6 | 29.4 | 1.4 | 0.58 | 490 | 95 |
| EM 5-3 | 900 | 0.3 | 9.0 | 51.4 | 0.0 | 20.1 | 28.5 | 1.4 | 0.61 | 410 | 96 |
| PE 5-1 | 700 | 0.3 | 9.0 | 47.7 | 1.9 | 20.8 | 29.6 | 1.4 | 1.33 | 750 | 95 |
| PE 5-2 | 900 | 0.3 | 9.0 | 47.3 | 28.0 | 10.2 | 14.5 | 1.4 | 12.50 | >20000 | 98 |

Further, in the following table 4, in the case of producing a Ni—Cu—Zn system ferrite ceramics sintered body having a composition comprised of 48.3 mol % of $Fe_2O_3$, 8.6 mol % of NiO, 7.4 mol % of CuO and 35.7 mol % of ZnO, the experimental data similar to that of the table 1 is described.

TABLE 4

| | POWDERS | | | FERRITE PRE-FIRED POWDERS | | | | | | PC 40 Vol % | |
|---|---|---|---|---|---|---|---|---|---|---|---|
| | CT | MD | SSA | CS (mol %) | | | | | RM Br | VS | RD |
| | (° C.) | (μm) | (m2/g) | Fe2O3 | NiO | CuO | ZnO | ZnO/CuO | (emu/g) | (cps) | (%) |
| CE 6-1 | 700 | 0.3 | 9.0 | 49.5 | 0.0 | 8.7 | 41.8 | 4.8 | 0.10 | 200 | 92 |
| PE 6-1 | 700 | 0.3 | 9.0 | 48.3 | 0.2 | 8.9 | 42.6 | 4.8 | 0.52 | 320 | 93 |

Further, in the following table 5, in the case of producing a Ni—Cu—Zn system ferrite ceramics sintered body having a composition comprised of 47.2 mol % of $Fe_2O_3$, 32.5 mol % of NiO, 10.6 mol % of CuO and 9.7 mol % of ZnO, the experimental data similar to that of the table 1 is described.

TABLE 5

| | POWDERS | | | FERRITE PRE-FIRED POWDERS | | | | | | PC 40 Vol % | |
|---|---|---|---|---|---|---|---|---|---|---|---|
| | CT | MD | SSA | CS (mol %) | | | | | RM Br | VS | RD |
| | (° C.) | (μm) | (m2/g) | Fe2O3 | NiO | CuO | ZnO | ZnO/CuO | (emu/g) | (cps) | (%) |
| CE 7-1 | 700 | 0.3 | 9.0 | 49.0 | 0.0 | 26.5 | 24.5 | 0.9 | 4.30 | 510 | 95 |
| PE 7-1 | 700 | 0.3 | 9.0 | 47.2 | 3.2 | 25.8 | 23.9 | 0.9 | 5.20 | 830 | 95 |

The followings can be understood from the experimental data of the tables 2 to 5. That is, in the case where the slurry having the powder concentration (PC) of 40 vol % was produced and the ceramics sintered body was produced using the slurry, the examples of the present invention (EM) 4-1 to 4-3 and 5-1 to 5-3 were the examples in which the viscosity of the slurry (VS) was equal to or lower than the preferred viscosity and the relative density (RD) of the ceramics sintered body was equal to or higher than the preferred relative density and the comparative examples (CE) and the prior art examples (PE) had the viscosity of the slurry (VS) higher than the preferred viscosity or the relative density (RD) of the ceramics sintered body lower than the preferred relative density.

Further, comparing the examples of the present invention (EM) with the prior art examples (PE), it can be also understood that the viscosity of the slurry (VS) of the examples of the present invention is lower than that of the prior art examples and becomes largely lower than that of the prior art examples as the calcination temperature (CT) becomes high.

Further, from the results indicated in the tables 1 to 5, it can be understood that when ZnO/CuO is within the range of 1.0 to 4.0, the preferred conditions (i.e. the viscosity of the slurry (VS) is equal to or lower than the preferred viscosity and the relative density (RD) of the ceramics sintered body is equal to or higher than the preferred relative density) are satisfied.

From the above results of the experiments, it is understood that when the specific surface area (SSA) of the ferrite calcined powders is within the range of 4.0 m²/g to 14.0 m²/g, the composition of the spinel in the ferrite calcined powders is such that $Fe_2O_3$ is within the range of 49.0 mol % to 60 mol % (as is obvious, since NiO is 0 mol %, the remaining is CuO and ZnO) and ZnO/CuO is within the range of 1.0 to 4.0, the viscosity of the slurry (VS) is equal to or lower than the preferred viscosity and the relative density (RD) of the ceramics sintered body is equal to or higher than the preferred relative density. That is, when the slurry is produced using the powders of the present invention, the viscosity of the slurry is equal to or lower than the preferred viscosity and when the ceramics sintered body is produced using the slurry, the relative density of the ceramics sintered body is equal to or higher than the preferred relative density.

It should be noted that the present invention is not limited to the above embodiments, but may be modified as appropriate without departing from the scope of the invention. Further, it should be noted that the contents of Japanese Patent Application Nos. 2010-62764 and 2011-16081 are incorporated in this application by reference.

The invention claimed is:

1. A powder for producing a Ni—Cu—Zn system ferrite ceramic sintered body, said powder comprising:
   a ferrite calcined powder; and
   an NiO powder;
   wherein a specific surface area of said ferrite calcined powder is within the range of 4.0 m²/g to 14.0 m²/g; and
   wherein a spinel composition of said ferrite calcined powder is such that Ni does not solve in said spinel composition, and the composition of said spinel is such that $Fe_2O_3$ is within the range of 49.0 mol % to 60.0 mol % and the remaining comprises CuO and ZnO, and a ratio of ZnO relative to CuO in mol % is within the range of 1.0 to 4.0.

2. A slurry produced from the powder according to claim 1.

3. A Ni—Cu—Zn system ferrite ceramic sintered body produced from the slurry according to claim 2.

4. A method for manufacturing a powder used for producing a Ni—Cu—Zn system ferrite ceramics sintered body, the method comprising:
   a step of mixing $Fe_2O_3$ powders, CuO powders and ZnO powders, except for NiO powders, to obtain a mixed powder;
   a step of calcining said mixed powder obtained by said mixing step to obtain a ferrite calcined body; and
   a step of milling said ferrite calcined body obtained by said calcination step to obtain a ferrite calcined powder and, at the same time, mixing said ferrite calcined powder with an NiO powder;

wherein a specific surface area of said ferrite calcined powder obtained by said milling and mixing step is within the range of 4.0 m²/g to 14.0 m²/g; and wherein a spinel composition of said ferrite calcined powder is such that Ni does not solve, the composition of said spinel being such that $Fe_2O_3$ is within the range of 49.0 mol % to 60.0 mol % and the remaining comprises CuO and ZnO, and a ratio of ZnO relative to CuO in mole percent is within the range of 1.0 to 4.0.

5. A method for producing a slurry, comprising a step of blending a mixture of a dispersion medium, a dispersion agent and the powder manufactured according to the method of claim 4 to obtain the slurry.

6. A method for producing a ceramic sintered body, comprising a step of producing a compact from the slurry produced according to claim 5, and firing said compact to obtain the ceramic sintered body.

* * * * *